US012372964B2

(12) United States Patent
Nishii et al.

(10) Patent No.: US 12,372,964 B2
(45) Date of Patent: Jul. 29, 2025

(54) AUTOMATIC DRIVING METHOD, WORK VEHICLE, AND AUTOMATIC DRIVING SYSTEM

(71) Applicant: Yanmar Power Technology Co., Ltd., Osaka (JP)

(72) Inventors: Yasuto Nishii, Osaka (JP); Yuji Yamaguchi, Osaka (JP); Masaaki Murayama, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 430 days.

(21) Appl. No.: 17/742,458

(22) Filed: May 12, 2022

(65) Prior Publication Data
US 2022/0365537 A1   Nov. 17, 2022

(30) Foreign Application Priority Data

May 12, 2021  (JP) ................................. 2021-081078

(51) Int. Cl.
G05D 1/02 (2020.01)
A01D 41/127 (2006.01)
G05D 1/00 (2006.01)

(52) U.S. Cl.
CPC ....... *G05D 1/0212* (2013.01); *A01D 41/1278* (2013.01)

(58) Field of Classification Search
CPC ........ G05D 1/0212; G05D 1/02; G05D 1/648; G05D 2105/15; G05D 2107/21;
(Continued)

(56) References Cited

U.S. PATENT DOCUMENTS 6,691,015 B1 *  2/2004  Levine ..................... G08G 1/22
                                                340/905
9,956,904 B2 *  5/2018  Raubvogel ......... G01C 21/3626
(Continued)

FOREIGN PATENT DOCUMENTS

EP       3725632 A1    10/2020
JP     2018001867 A     1/2018
(Continued)

OTHER PUBLICATIONS

Notice of Reasons for Refusal—Japanese Patent Application No. 2021-081078, Date: Aug. 26, 2024.

*Primary Examiner* — Andrew Joseph Rudy
(74) *Attorney, Agent, or Firm* — Chris Mizumoto

(57) ABSTRACT

To provide an automatic driving method, a work vehicle, and an automatic driving system, by which it is possible to perform automatic travel with improved operability. A combine is a work vehicle executing an automatic travel, based on a preset travel route, and includes a steering wheel being a turn operation tool that accepts a turn operation to instruct turning of the combine, a control device that functions as an automatic travel control unit that controls the automatic travel of the combine, based on a travel route, and an override button being a turn operation permission unit that permits a turn operation on the steering wheel during execution of the automatic travel. The travel unit does not accept the turn operation under a normal circumstance during execution of the automatic travel but once the override button is operated, accepts the turn operation.

13 Claims, 9 Drawing Sheets

(58) Field of Classification Search
CPC ............ G05D 2109/10; A01D 41/1278; A01D 41/127; A01B 69/008
USPC ........................................................ 701/476
See application file for complete search history.

(56) References Cited

U.S. PATENT DOCUMENTS

| | | | |
|---|---|---|---|
| 10,520,946 B2* | 12/2019 | Kahn ................... | B60W 30/09 |
| 11,472,395 B2* | 10/2022 | Dix ...................... | B62D 11/003 |
| 11,772,670 B2* | 10/2023 | Bielby .................. | B60W 50/12 |
| | | | 701/70 |
| 11,926,313 B2* | 3/2024 | Matsushita ....... | B60W 60/0025 |
| 2009/0069977 A1* | 3/2009 | Markyvech ............ | B60Q 1/346 |
| | | | 701/76 |
| 2016/0349751 A1* | 12/2016 | Sugimoto ....... | B60W 30/18163 |
| 2024/0008383 A1* | 1/2024 | Suzuki ................ | G05D 1/0212 |

FOREIGN PATENT DOCUMENTS

| | | |
|---|---|---|
| JP | 2020018238 A | 2/2020 |
| LA | 2008154556 A | 7/2008 |
| WO | 2020026651 A1 | 2/2020 |

* cited by examiner

AUTOMATIC DRIVING METHOD, WORK VEHICLE, AND AUTOMATIC DRIVING SYSTEM

CROSS-REFERENCE

This application claims foreign priority of JP2021-081078 filed May 12, 2021, the disclosure of which is hereby incorporated by reference in its entirety.

TECHNICAL FIELD

The present invention relates to an automatic driving method for a work vehicle automatically traveling based on a preset travel route, a work vehicle, and an automatic driving system.

BACKGROUND ART

Conventionally, a work vehicle such as a combine or a tractor is provided with a turn operation tool such as a steering wheel for instructing turning of a main body, and accepts a turn operation on the turn operation tool when performing a manual travel. Further, some work vehicles automatically travel based on a preset travel route, and in the automatic travel, the vehicles turning based on the travel route without accepting the turn operation on the turn operation tool.

For example, Patent Document 1 discloses a harvester capable of automatically traveling in a farm field. The harvester includes an operation tool having a function for changing a state of the main body while continuing the automatic travel during the automatic travel, a main body detection unit that detects the state of the main body, and a function setting unit that enables or disables the function according to the state of the main body detected by the main body state detection unit when the operation tool is operated. For example, the operation tool is a turn operation tool that instructs the turning of the main body, and the function setting unit disables the function of the turn operation tool during the automatic travel and instructs stopping when the turn operation tool is operated more strongly than a preset operation amount.

PRIOR ART DOCUMENT

Patent Document

Patent Document 1: Japanese Unexamined Patent Application Publication No. 2020-18238

SUMMARY OF INVENTION

Technical Problem

However, in a conventional work vehicle such as the harvester of Patent Document 1, the turn operation of the main body is not possible during the automatic travel, and if the turn operation is desired, it is necessary to stop the main body once and switch to a manual travel. Therefore, when the automatic travel is performed, it is not possible to perform course correction according to the operator's intention with a simple operation, which reduces operability, and each time the course is corrected, it is necessary to perform an operation to interrupt the automatic travel to stop the vehicle, and thus, the work efficiency may decrease.

An object of the present invention is to provide an automatic driving method, a work vehicle, and an automatic driving system, by which it is possible to perform automatic travel with improved operability.

Solution to Problem

To solve the above problems, an automatic driving method according to the present invention is an automatic driving method for a work vehicle executing an automatic travel, based on a preset travel route, the method including a turn instruction step of instructing the work vehicle to turn according to a turn operation on a turn operation tool provided in the work vehicle, an automatic travel control step of controlling the automatic travel of the work vehicle, based on the travel route, and a permission operation step of permitting the turn operation on the turn operation tool during execution of the automatic travel according to an operation on a turn operation permission unit provided in the work vehicle, in which in the turn instruction step, during execution of the automatic travel, the turn operation on the turn operation tool is not accepted under a normal circumstance but when the turn operation permission unit is operated, the turn operation on the turn operation tool is accepted.

To solve the above-mentioned problems, a work vehicle according to the present invention is a work vehicle performing an automatic travel, based on a preset travel route, the work vehicle including a turn operation tool that accepts a turn operation to instruct turning, an automatic travel control unit that controls the automatic travel based on the travel route, and a turn operation permission unit that permits a turn operation on the turn operation tool during execution of the automatic travel, in which the turn operation tool does not accept the turn operation under a normal circumstance during execution of the automatic travel but when the turn operation permission unit is operated, accepts the turn operation.

To solve the above problems, an automatic driving system according to the present invention is an automatic driving system including a work vehicle performing an automatic travel, based on a preset travel route, the automatic driving system including a turn operation tool that accepts a turn operation to instruct turning of the work vehicle, an automatic travel control unit that controls the automatic travel of the work vehicle, based on the travel route, and a turn operation permission unit that permits a turn operation on the turn operation tool during execution of the automatic travel, in which the turn operation tool does not accept the turn operation under a normal circumstance during execution of the automatic travel but when the turn operation permission unit is operated, accepts the turn operation.

Advantageous Effects of Invention

According to the present invention, it is possible to provide an automatic driving method, a work vehicle, and an automatic driving system by which it is possible to perform automatic travel with improved operability.

DESCRIPTION OF EMBODIMENTS

A combine 1 which is an embodiment of a work vehicle according to the present invention will be described with reference to FIG. 1 and the like. The work vehicle is designed to be capable of automatic travel, based on a preset travel route, and the combine 1 travels in the farm field to be worked by an automatic driving or a manual operation, and performs a work such as reaping to harvest crops from a grain culm planted in the farm field.

In the combine 1, a travel mode, either a manual travel mode or an automatic travel mode, is set. When the manual travel mode is set, the combine 1 is configured to perform the manual travel according to a steering operation of a steering unit 9 by an operator.

On the other hand, when the automatic travel mode is set, the combine 1 is configured to perform automatic reaping travel in which the combine 1 performs automatic reaping while automatically traveling according to a preset travel route. For example, the combine 1 performs the automatic reaping travel having a travel pattern such as reciprocating reaping in which the combine 1 reciprocates between a plurality of work routes in an area with unreaped grain culm in the farm field (hereinafter referred to as "unreaped area"), and a reaping while circulating in which reaping is repeated by shifting a periphery of the work route along an inner perimeter of the unreaped region toward the center of the unreaped area.

Figure 1:
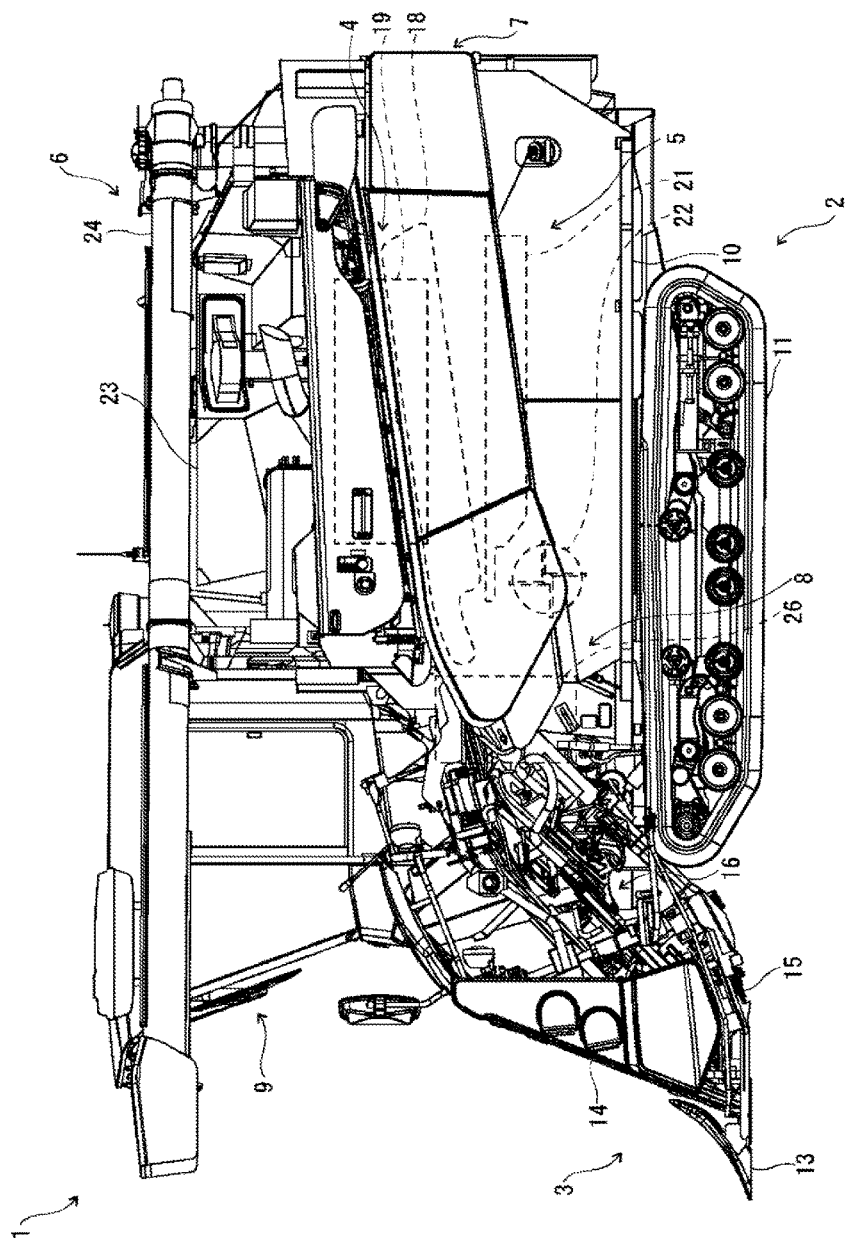
FIG. 1 is a side view of a combine according to an embodiment of a work vehicle of the present invention.

As illustrated in FIG. 1, the combine 1 includes a travel unit 2, a reaping unit 3, a threshing unit 4, a sorting unit 5, a reservoir unit 6, a discharged-straw processing unit 7, a power unit 8, and the steering unit 9, and is configured as a so-called head-feeding type combine. The combine 1 travels by the travel unit 2, threshes the grain culms reaped by the reaping unit 3 in the threshing unit 4, sorts the grains in the sorting unit 5, and stores the sorted grains in the reservoir unit 6. The combine 1 processes a discharged straw obtained as a result of the threshing by the discharged-straw processing unit 7. The combine 1 drives the travel unit 2, the reaping unit 3, the threshing unit 4, the sorting unit 5, the reservoir unit 6, and the discharged-straw processing unit 7 by the power supplied by the power unit 8.

The travel unit 2 is provided below a main body frame 10, and includes a pair of left and right crawler-type travel devices 11 and a power transmission mechanism 12 (see FIG. 2). The travel unit 2 rotates a crawler of the crawler type traveling device 11 by the power transmitted from an engine 26 of the power unit 8 (for example, rotational power), so that the combine 1 travels in the front-rear direction or turns in the left-right direction. The power transmission mechanism 12 is configured by a transmission or the like, transmits the power (rotational power) of the power unit 8 to the crawler type traveling device 11, and is capable of shifting the rotational power.

The reaping unit 3 is provided forward of the travel unit 2 and performs a reaping work of rows within the maximum number of reaping rows, and a reaping width is determined according to the number of rows targeted for the reaping work. The reaping unit 3 includes a divider 13, a raising device 14, a cutting device 15, and a transport device 16. The divider 13 divides the grain culm in the farm field for each row, and guides the grain culm for a predetermined number of rows within the maximum number of reaping rows to the raising device 14. The raising device 14 raises the grain culm guided by the divider 13. The cutting device 15 cuts the grain culm raised by the raising device 14. The transport device 16 transports the grain culm cut by the cutting device 15 to the threshing unit 4.

The threshing unit 4 is provided rearward of the reaping unit 3. The threshing unit 4 includes a feed chain 18 and a threshing cylinder 19. The feed chain 18 transports the grain culm transported from the transport device 16 of the reaping unit 3 for threshing, and further transports the threshed grain culm, that is, a discharged straw, to the discharged-straw processing unit 7. The threshing cylinder 19 threshes the grain culm transported by the feed chain 18.

The sorting unit 5 is provided below the threshing unit 4. The sorting unit 5 includes a swing sorting device 21, a wind sorting device 22, a grain transport device (not illustrated), and a waste straw discharging device (not illustrated). The swing sorting device 21 sifts the threshed grains that have fallen from the threshing unit 4 and sorts the threshed grains into grains, a straw waste, and the like. The wind sorting device 22 further sorts the threshed grains sorted by the swing sorting device 21 into grains, a straw waste, and the like by blowing air. The grain transport device transports the grains sorted by the swing sorting device 21 and the wind sorting device 22 to the reservoir unit 6. The waste straw discharging device discharges the straw waste and the like sorted by the swing sorting device 21 and the wind sorting device 22 to the outside of the combine.

The reservoir unit 6 is provided on the right side of the threshing unit 4. The reservoir unit 6 includes a grain tank 23 and a discharge device 24. The grain tank 23 stores the grains transported from the sorting unit 5. The discharge device 24 is configured by an auger or the like, performs a grain discharging operation, and discharges the grains stored in the grain tank 23 to any place. The discharge device 24 is controlled by a control device 50 (see FIG. 2) to automatically perform the discharge operation or manually according to the operation on the steering unit 9.

The discharged-straw processing unit 7 is provided rearward of the threshing unit 4. The discharged-straw processing unit 7 includes a discharged-straw transport device (not illustrated) and a discharged-straw cutting device (not illustrated). For example, the discharged-straw processing unit 7 directly discharges the discharged straw transported from the feed chain 18 of the threshing unit 4 to the outside of the combine 1 (for example, rearward or downward of the combine 1) by the straw discharge transport device. Alternatively, the discharged-straw processing unit 7 transports the discharged straw by the discharged-straw transport device to the discharged-straw cutting device, the discharged straw is cut by the discharged-straw cutting device, and then is discharged to outside of the combine 1 (for example, rearward of the combine 1).

The power unit 8 is provided above the travel unit 2 and forward of the reservoir unit 6. The power unit 8 includes an engine 26 that generates rotational power. The power unit 8 transmits the rotational power generated by the engine 26 to the travel unit 2, the reaping unit 3, the threshing unit 4, the sorting unit 5, the reservoir unit 6, and the discharged-straw processing unit 7. The combine 1 includes a fuel tank (not illustrated) that accommodates a fuel to be supplied to the engine 26 of the power unit 8.

Figure 3:
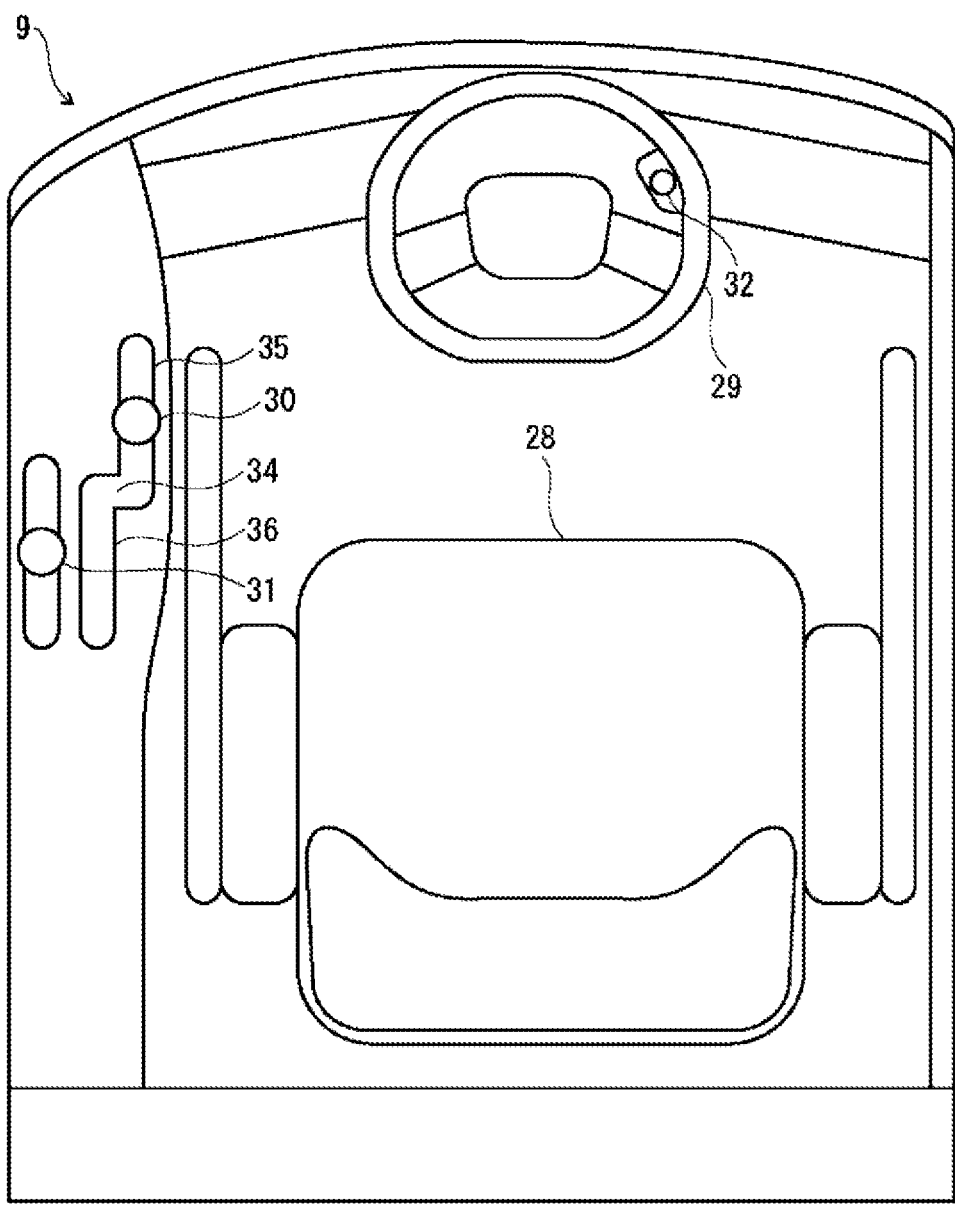
FIG. 3 is a plan view of a steering unit of a combine according to an embodiment of a work vehicle of the present invention.

The steering unit 9 is provided above the power unit 8. As illustrated in FIG. 3, the steering unit 9 is provided with an operation tool for steering the travel of the combine 1, around a driver's seat 28, that is, a seat on which the operator sits. As the operation tool, the steering unit 9 includes a steering wheel 29 being a turn operation tool for instructing turning of the main body of the combine 1, and a main speed change lever 30 and an auxiliary speed change lever 31, each being a speed change operation tool for instructing the combine 1 to change a speed in forward-and-backward movements. The manual traveling of the combine 1 is executed by the travel unit 2 (power transmission mechanism 12) that receives the operations on the steering wheel 29 of the steering unit 9, the main speed change lever 30, and the auxiliary speed change lever 31.

The steering unit 9 includes an override button 32 serving as a turn operation permission unit that permits the turn operation on the steering wheel 29 being a turn operation tool during execution of the automatic travel of the combine 1. The steering unit 9 is provided with a mechanism for operating a reaping operation by the reaping unit 3, a threshing operation by the threshing unit 4, a discharge operation by the discharge device 24 of the reservoir unit 6, and the like. The steering unit 9 includes a display unit 33 such as a monitor for displaying various information to be output to the operator (see FIG. 2).

The steering wheel 29 transmits the turn operation by the operator to the power transmission mechanism 12 of the travel unit 2 to change a movement direction of the combine 1, that is, to turn the combine 1. For example, during execution of the manual travel of the combine 1, the travel unit 2 (power transmission mechanism 12) constantly accepts the turn operation on the steering wheel 29 by the operator. On the other hand, during execution of the automatic travel of the combine 1, the travel unit 2 does not accept, under a normal circumstance, the turn operation on the steering wheel 29 by the operator, but accepts the turn operation on the steering wheel 29 when the override button 32 is operated. The steering wheel 29 is configured to have a margin of about ±5 degrees in the rotation direction so that the operation within this margin is not transmitted to the travel unit 2. It is noted that the margin of the steering wheel 29 is not limited to ±5 degrees and can be adjusted artificially.

The main speed change lever 30 and the auxiliary speed change lever 31 transmit a speed change operation by the operator to the power transmission mechanism 12 of the travel unit 2 to switch a setting speed of the travel of the combine 1. For example, if the manual travel mode is set, the main speed change lever 30 stops the combine 1 when the main speed change lever 30 is in a central neutral position 34. When the main speed change lever 30 is tilted to a forward speed change region 35 frontward of the neutral position 34, a forward travel operation of the combine 1 is transmitted to the travel unit 2, and the forward set speed according to a position in a front-rear direction of the main speed change lever 30 in the forward speed change region 35 longer in the front-rear direction is set to the travel unit 2. When the main speed change lever 30 located in the forward speed change region 35 is tilted forward from the neutral side, the forward set speed is increased, and on the other hand, when the main speed change lever 30 is tilted to the neutral side from the forward position, the forward set speed is decreased.

On the other hand, when the main speed change lever 30 is tilted to a backward speed change region 36 rearward of the neutral position 34, a backward travel operation of the combine 1 is transmitted to the travel unit 2, and the backward set speed according to a position in a front-rear direction of the main speed change lever 30 in the backward speed change region 36 longer in the front-rear direction is set to the travel unit 2. When the main speed change lever 30 located in the backward speed change region 36 is tilted rearward from the neutral side, the backward set speed is increased, and on the other hand, when the main speed change lever 30 is tilted to the neutral side from the rearward position, the backward set speed is decreased.

When the automatic travel mode is set so that the combine 1 automatically travels, the main speed change lever 30 is located in the forward speed change region 35. When the automatic travel mode is set, the main speed change lever 30 being located in the forward speed change region 35 may be used as one of automatic travel start conditions of the combine 1. In the automatic forward travel, a set vehicle speed is set within the range of 0 to 100% by the mobile terminal 53 or the like, the forward set speed based on a speed set value according to a position in the front-rear direction of the main speed change lever 30 in the forward speed change region 35 and the above set vehicle speed is set to the travel unit 2, and for example, if the main speed change lever 30 is tilted forward from the neutral side during the automatic travel, the forward set speed is increased, and on the other hand, when the main speed change lever 30 is tilted from the forward position to the neutral side, the forward set speed is decreased. For example, if the set vehicle speed is 50% and the speed set value is 2 m/s, the forward set speed is set to 1 m/s. Also in the automatic backward travel, a set vehicle speed is set within the range of 0 to 100% by the mobile terminal 53 or the like, and the backward set speed based on a speed set value according to a position in the front-rear direction of the main speed change lever 30 in the forward speed change region 35 and the above set vehicle speed is set to the travel unit 2.

The override button 32 is provided in the steering wheel 29, for example, and arranged at a position where a finger of the operator sitting on the driver's seat 28 and holding the steering wheel 29 can be reached. Alternatively, the override button 32 may be arranged on the work screen 55 (see FIG. 4) of the mobile terminal 53 (see FIG. 2) and may be arranged side by side with a stop button 56 of the main body.

The override button 32 is configured to switch on and off according to the operation of the operator. During execution of the automatic travel of the combine 1, the travel unit 2 accepts the turn operation on the steering wheel 29 if the override button 32 is on, and on the other hand, does not accept the turn operation on the steering wheel 29 if the override button 32 is off. Alternatively, the override button 32 may be configured so that when the automatic travel is set and the combine 1 performs the automatic travel, if the override button is operated (depressed) by the operator, the travel mode is completely switched from the automatic travel mode to the manual travel mode by the control device 50. In this case, the combine 1 switches the automatic travel to the manual travel and the travel unit 2 is in a state of accepting the turn operation on the steering wheel 29. It is noted that even if the override button 32 is operated again, the control device 50 will not switch the travel mode to the automatic travel mode.

For example, the override button 32 may be configured as a one-touch type (so-called alternate type) push button, and in this case, on and off are switched each time the override button 32 is depressed. Alternatively, the override button 32 may be configured as a press- and hold type push button, and in this case, the override button 32 is switched on according to a press-and-hold operation for a predetermined time (for example, 5 seconds) or longer, and then, is switched to off according to a one-touch operation or a press-and-hold operation. Alternatively, the override button 32 may be configured as a push button switching to on only when depressed (so-called a momentary type), and in this case, when the override button 32 is depressed, that is, pushed, the override button 32 is switched to on and when the depressing operation is released, that is, not pushed, the override button 32 is switched to off.

Figure 2:
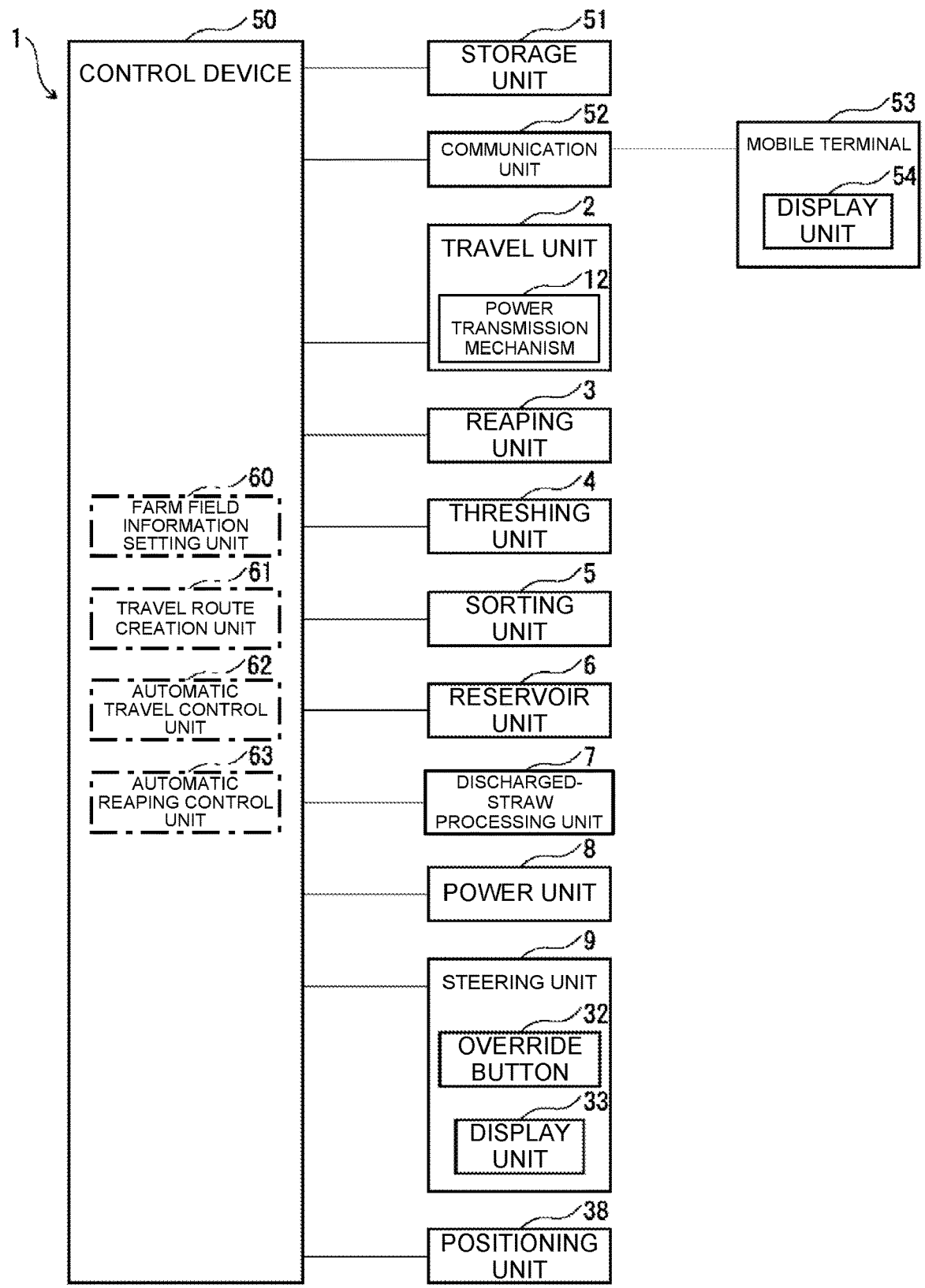
FIG. 2 is a block diagram of a combine according to an embodiment of the work vehicle of the present invention.

As illustrated in FIG. 2, the combine 1 includes a positioning unit 38 that acquires position information of the combine 1 by utilizing a satellite positioning system such as GPS. The positioning unit 38 receives a positioning signal from a positioning satellite via a positioning antenna, and acquires the position information of the positioning unit 38, that is, the position information of the combine 1, based on the positioning signal.

It is noted that the combine 1 may be configured to be communicable with a base station (not illustrated) installed in a ridge or the like around the farm field. The base station receives the positioning signal from the positioning satellite via the positioning antenna, and acquires position information of the base station based on the positioning signal. The base station transmits correction information based on the position information of the base station to the combine 1 (for example, the positioning unit 38). The combine 1 (for example, the positioning unit 38) receives the correction information from the base station and corrects the position information of the positioning unit 38, that is, the position information of the combine 1 based on the correction information.

Next, the control device 50 of the combine 1 will be described with reference to FIG. 2. The control device 50 is configured by a computer such as a CPU, and is connected to a storage unit 51 such as a ROM, a RAM, a hard disk drive, and a flash memory, and a communication unit 52 that communicates with an external device. The storage unit 51 stores a program and data for controlling various constituent components and various functions of the combine 1, and when the control device 50 executes arithmetic processing based on the program and the data stored in the storage unit 51, the various typed of constituent components and the various types of functions are controlled. The control device 50 controls, for example, the positioning unit 38 to acquire the position information of the combine 1.

The storage unit 51 stores, for example, farm field information of a farm field to be worked by the combine 1. The farm field information includes a shape, a size, and the position information (coordinates and the like) of a farm field edge configuring an external perimeter of the farm field, and a shape, a size, and the position information (coordinates and the like) of the unreaped region of the farm field.

The communication unit 52 is capable of wirelessly communicating with an external device such as the mobile terminal 53 owned by the operator via a wireless communication antenna. The control device 50 controls the communication unit 52 to perform wireless communication with the mobile terminal 53, and transmits and receives various types of information to and from the mobile terminal 53.

The mobile terminal 53 is one of the constituent components of the combine 1, is a terminal capable of remotely operating the combine 1, and for example, is configured by a tablet terminal provided with a touch panel, a notebook-type personal computer, or the like. The mobile terminal 53 includes a display unit 54 such as a touch panel and a monitor for displaying and outputting various information to the operator, and also includes an input unit such as a touch panel and an operation key for receiving an input operation of various information from the operator. It is noted that the steering unit 9 may be provided with an operation device similar to the mobile terminal 53. For example, the mobile terminal 53 displays a screen (for example, a home screen or a mode setting screen) allowing the operator to set either the manual travel mode or the automatic travel mode of the combine 1 on the display unit 54, and transmits the travel mode set according to the operation of the operator to the combine 1.

The mobile terminal 53 is configured to accept an input operation for the farm field information related to the farm field to be worked via the input unit, and for example, displays a farm field information setting screen through which the farm field information is settable. The mobile terminal 53 is capable of displaying a farm field map based on the farm field information on the farm field information setting screen and displaying the travel route of the combine 1 on the farm field map so that the user understands the movement direction. The mobile terminal 53 transmits the farm field information set on the farm field information setting screen to the combine 1.

The mobile terminal 53 has a function for accepting selection of a travel pattern for the automatic reaping travel of the combine 1, and in creating the travel route of the automatic reaping travel, displays, on the display 54, a screen (for example, a travel selection screen) for selecting the travel pattern such as a reciprocating reaping or a reaping while circulating. The mobile terminal 53 transmits the travel pattern (the reciprocating reaping or the reaping while circulating) input according to the operation of the operator to the combine 1 and instructs the combine 1 to create the travel route. The mobile terminal 53 may previously set the set vehicle speed in the range of 0 to 100% and associate such a speed with the travel route.

Figure 4:
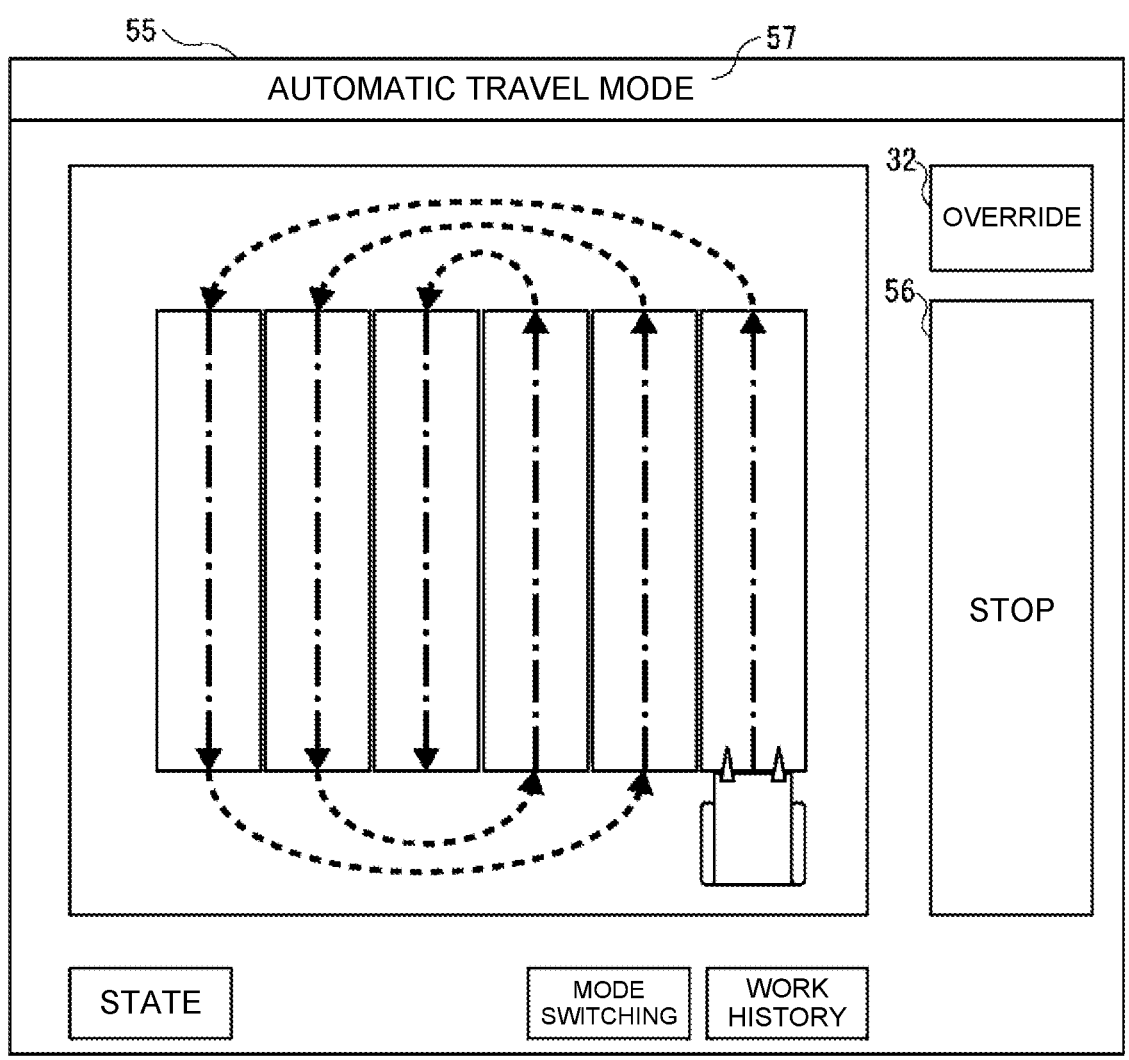
FIG. 4 is a plan view illustrating an example of a work screen displayed in a mobile terminal in a combine according to an embodiment of the work vehicle of the present invention.

If the combine 1 executes the automatic reaping travel, the mobile terminal 53 displays the work screen 55 of the automatic reaping travel on the display unit 54 as illustrated in FIG. 4. On the work screen 55, for example, a stoppage button 56 for operating a temporary stoppage of the main body and the override button 32 described above are operably displayed. On the work screen 55, in addition to the farm field and the travel route for the automatic reaping travel, the current position of the combine 1 is displayed to be confirmed. On the work screen 55, the set travel mode is displayed identifiably in a title column 57, and the automatic travel mode is displayed, and in addition, the travel mode automatically switched according to a work situation is also displayed. In the mobile terminal 53, the set vehicle speed may be settable within the range of 0 to 100% on the work screen 55.

In executing the program stored in the storage unit 51, the control device 50 operates as a farm field information setting unit 60, a travel route creation unit 61, an automatic travel control unit 62, and an automatic reaping control unit 63. It is noted that the travel route creation unit 61, the automatic travel control unit 62, and the automatic reaping control unit 63 realize a travel route creation step, an automatic travel control step, and an automatic reaping control step in an automatic driving method according to the present invention. The travel unit 2 (power transmission mechanism 12) functions as a turn instruction unit that instructs turning of the combine 1 according to the turn operation on the steering wheel 29, and realizes a turn instruction step of an automatic driving method according to the present invention. The override button 32 functions as a turn operation permission unit that permits, during execution of the automatic travel of the combine 1, the turn operation on the steering wheel 29, and realizes a permission operation step of an automatic driving method according to the present invention.

The farm field information setting unit 60 automatically or manually sets the farm field information related to the farm field to be worked and stores such information in the storage unit 51. For example, the farm field information setting unit 60 manually sets the farm field information in response to the input operation of the farm field information on the farm field information setting screen of the mobile terminal 53. Alternatively, the farm field information setting unit 60 may receive the farm field information stored in a server and automatically set such information by communicating with the server (not illustrated). In the farm field information setting unit 60, the farm field information received from the server may be editable on the farm field information setting screen of the mobile terminal 53.

In another example, the farm field information setting unit 60 may acquire a farm field image obtained by photographing the farm field to be worked and set the farm field information based on a result obtained by analyzing the farm field image. The farm field information setting unit 60 may take appropriate matching among the farm field information set according to the operation of the mobile terminal 53, the farm field information received from the server, and the farm field information obtained by analyzing the farm field image to obtain more precise farm field information.

The farm field image may be captured by a main body camera provided in the combine 1, an image captured by a mobile camera provided in the mobile terminal 53 may be received by the communication unit 52, and an image captured by an aerial photography camera provided in an aerial photography device such as a drone may be received by the communication unit 52. The farm field information setting unit 60 may analyze the farm field information from the farm field image captured by one camera, out of the main body camera, the mobile camera, or the aerial photography camera, and may analyze the farm field information from the farm field image of captured by two or more cameras. The control device 50 may control so that the farm field image captured by the main body camera, the mobile camera, or the aerial photography camera is displayed on the display 33 of the steering unit 9, and transmit such an image to the mobile terminal 53 to be displayed on the display unit 54 of the mobile terminal 53.

The travel route creation unit 61 creates a travel route to be referred to for the combine 1 to perform the automatic travel and the automatic reaping (automatic reaping travel) in the farm field by the automatic driving, and stores such a travel route in the storage unit 51. The travel route includes not only a travel setting for the automatic travel but also a work setting for a work including the automatic reaping. The travel setting includes, in addition to the travel position in the farm field, the movement direction (a steering direction and a forward or backward movement) and the set vehicle speed at each travel position. The work setting includes information on an operation or a stoppage of reaping at each travel position, a reaping speed and a reaping height, the number of reaping rows, and other work.

The travel route creation unit 61 sets a linear work route along which the reaping is performed while traveling in the forward direction in the unreaped region within the farm field, and sets the travel route by combining a plurality of work routes. The travel route creation unit 61 sets an idle route in which the combine 1 travels while making a turn as if to avoid a headland between two consecutive work routes. That is, the travel route creation unit 61 creates a travel route including a plurality of work routes and an idle route between each work route. In addition to the work route and the idle route, to move in a region of the farm field where the grain culm is already reaped, the travel route creation unit 61 may set a movement route along which the combine 1 linearly travels in the forward direction or in the backward direction, and a movement route along which the combine 1 travels while making turns to create the travel route.

The travel route creation unit 61 creates a travel route according to a travel pattern (the reciprocating reaping or the reaping while circulating) selected according to the operation of the mobile terminal 53 or the like. For example, the travel route creation unit 61 creates a travel route for the reaping while circulating in which the reaping is repeated by shifting a circumduction of the work route along an inner perimeter of the unreaped region toward the center of the unreaped region, and a travel route for the reciprocating reaping in which the combines 1 reciprocates between a plurality of work routes in the unreaped region. The travel route creation unit 61 sets a start position to start the automatic reaping travel and an end position to complete the automatic reaping travel along the travel route.

If the automatic travel mode is set, the automatic travel control unit 62 controls the power unit 8 and the travel unit 2, based on the travel setting of the travel route created by the travel route creation unit 61 to execute the automatic travel according to the travel route. The combine 1 may include a gyro sensor and a directional sensor to acquire displacement information and directional information of the combine 1 so that the automatic travel control unit 62 may adjust the automatic travel of the combine 1, based on the displacement information and the directional information.

The automatic travel control unit 62 sets, as the setting speed of the automatic travel, the forward set speed or the backward set speed based on the speed setting value according to the position in the front-rear direction of the main speed change lever 30 and the setting vehicle speed, and at the same time, if the main speed change lever 30 is operated during execution of the automatic forward travel, changes the setting speed of the automatic travel according to the position of the main speed change lever 30. For example, if the main speed change lever 30 located in the forward speed change region 35 is tilted forward from the neutral side during automatic forward travel, the automatic travel control unit 62 increases the forward set speed according to the position in the front-rear direction of the main speed change lever 30, while, if the main speed change lever 30 is tilted to the neutral side from the forward side, the automatic travel control unit 62 decreases the forward set speed according to the position in the front-rear direction of the main speed change lever 30.

Even if the steering wheel 29 is operated during execution of the automatic travel, the travel unit 2 is in a state of not accepting the turn operation on the steering wheel 29, and thus, under a normal circumstance, the automatic travel control unit 62 continues the automatic travel based on the travel setting. However, if the override button 32 is operated and turned on during execution of automatic travel, the travel unit 2 is in a state of accepting the turn operation on the steering wheel 29, and thus, the automatic travel control unit 62 stops the automatic travel based on the travel setting. At this time, the travel unit 2 may continue the travel while maintaining the travel state (the movement direction, the travel speed, and the like) based on the main speed change lever 30 and the like when the automatic travel is stopped, and then, may shift the travel state to the manual travel. When the override button 32 is operated during execution of the automatic travel, the automatic travel control unit 62 may switch the travel mode from the automatic travel mode to the manual travel mode.

If the manual travel is shifted from the automatic travel according to the operation on the override button 32, and then, when the override button 32 is operated again, the override button 32 is turned off, if a separation distance from the combine 1 to the travel route is within a predetermined return distance, the automatic travel control unit 62 resumes the automatic travel based on the travel route. It is noted that not only a condition that the separation distance is within the return distance but also a condition that an orientation of the main body of the combine 1 is within a predetermined angle relative to an orientation of the travel route, may be considered as a condition to resume the automatic travel. At this time, the travel unit 2 is in a state of not accepting the turn operation on the steering wheel 29. The automatic travel control unit 62 may switch the traveling mode from the manual travel mode to the automatic travel mode. On the other hand, if the separation distance from the combine 1 to the travel route exceeds the return distance, the automatic travel control unit 62 may not resume the automatic travel based on the travel route but the travel unit 2 may continue the manual travel of the combine 1. It is noted that not only a condition that the separation distance exceeds the return distance but also a condition that an orientation of the main body relative to an orientation of the travel route exceeds a predetermined angle, may be considered as a condition to not resume the automatic travel. In this case, the mobile terminal 53 may apply a gray display to the override button 32 displayed on the work screen 55 of the display unit 54 to disenable the override button 32 so that the operator visually recognizes that it is not possible to resume the automatic travel.

If the automatic travel mode is set, the automatic reaping control unit 63 controls the power unit 8 and the reaping unit 3, based on the work setting of the travel route created by the travel route creation unit 61 to execute the automatic reaping according to the travel route. The automatic reaping control unit 63 controls so that the reaping unit 3 automatically reaps the unreaped grain culm on the travel route. Along with the automatic reaping, the automatic reaping control unit 63 controls the threshing unit 4, the sorting unit 5, the reservoir unit 6, and the discharged-straw processing unit 7 so that threshing of the grain culm after the reaping, sorting of the grain and the straw waste after the threshing, storage of the sorted grain, processing of discharged straw obtained as a result of the threshing, and the like are automatically executed.

An example of the travel operation of the combine 1 according to the present embodiment will be described with reference to a flowchart of FIG. 5. It is noted that the reaping operation of the combine 1 is performed in the unreaped region of the farm field as necessary, but such an operation will not be described below.

If the automatic travel mode is set to the combine 1 (step S1: Yes), firstly, the travel route creation unit 61 creates the travel route along which the automatic travel in the farm field to be worked is performed and the storage unit 51 stores such a travel route (step S2). Next, if the combine 1 satisfies various types of automatic travel start conditions (step S3: Yes), the automatic travel control unit 62 controls the power unit 8 and the travel unit 2, based on the travel setting of the created travel route to start the automatic travel (step S4). During execution of the automatic travel, the travel unit 2 is in a state of not accepting the turn operation on the steering wheel 29 by the operator. It is noted that if the automatic travel mode is not set (step S1: No) or the automatic travel start condition is not satisfied (step S3: No), the automatic travel is not started.

During execution of the automatic travel, if the operator operates the override button 32 (step S5: Yes), the travel unit 2 is in a state of accepting the turn operation on the steering wheel 29 by the operator (step S6). The automatic travel control unit 62 switches the travel mode to the manual travel mode from the automatic travel mode and stops the automatic travel based on the travel setting (step S7), and the travel unit 2 continues the travel while maintaining the travel state when the automatic travel is being stopped and shifts to the manual travel (step S8).

Thereafter, during execution of the manual travel, if the operator operates the override button 32 once again (step S9: Yes), when the separation distance from the combine 1 to the travel route is within a predetermined return distance (step S10: Yes) and when the orientation of the main body relative to the orientation of the travel route is within a predetermined angle (step S11: Yes), the travel mode is switched from the manual travel mode to the automatic travel mode, and the automatic travel control unit 62 resumes the automatic travel based on the travel route (step S12). At this time, the travel unit 2 is in a state of not accepting the turn operation on the steering wheel 29 (step S13).

On the other hand, if the override button 32 is not operated again (step S9: No) or if the separation distance from the combine 1 to the travel route exceeds the return distance (step S10: No), when the orientation of the main body relative to the orientation of the travel route exceeds the predetermined angle (step S11: No), the automatic travel control unit 62 does not resume the automatic travel based on the travel route and the travel unit 2 continues the manual travel of the combine 1 (step S14). Alternatively, if the separation distance from the combine 1 to the travel route exceeds the return distance (step S10: No) or if the orientation of the main body relative to the orientation of the travel route exceeds the predetermined angle (step S11: No), the manual travel may be ended and the travel operation of the combine 1 may be ended.

As described above, according to the present embodiment, the combine 1 which is an example of the work vehicle is a work vehicle for executing the automatic travel, based on the preset travel route, includes the steering wheel 29 being a turn operation tool that accepts a turn operation to instruct turning of the combine 1, the control device 50 that functions as an automatic travel control unit 62 that controls the automatic travel of the combine 1 based on the travel route, and the override button 32 being a turn operation permission unit that permits the turn operation on the steering wheel 29 during execution of the automatic travel. The travel unit 2 does not accept the turn operation under a normal circumstance during execution of the automatic travel but once the override button 32 is operated, accepts the turn operation.

As a result, when the automatic travel is performed, the combine 1 does not accept the turn operation on the steering wheel 29 under a normal circumstance, and thus, it is possible to suppress an erroneous operation. On the other hand, even when the automatic travel is performed, the turn operation on the steering wheel 29 is enabled with a simple operation of operating the override button 32 to correct a course according to the intention of the operator, and as a result, it is possible to improve the operability. Even when the course is corrected during the automatic travel, the interruption operation or the stoppage of the automatic travel is not necessary, and thus, it is possible to improve the work efficiency.

In the combine 1 according to the present embodiment, if, after the travel unit 2 accepts the turn operation on the steering wheel 29 according to the operation on the override button 32 during execution of the automatic travel, the override button 32 is operated again, the automatic travel control unit 62 executes the automatic travel based on the travel route if the separation distance from the combine 1 to the travel route is within a predetermined return distance. Alternatively, the automatic traveling control unit 62 may execute the automatic travel based on the travel route if the separation distance is within the return distance and the orientation of the main body of the combine 1 relative to the orientation of the travel route is within a predetermined angle.

As a result, if the movement when the override button 32 is operated is within a return distance from the travel route or if the orientation of the main body of the combine 1 relative to the orientation of the travel route is within a predetermined angle, the combine 1 is capable of returning to the automatic travel based on the travel route. Therefore, if the turn operation in which the override button 32 is utilized in the automatic travel is used as well, it is possible to easily realize the travel according to the intention of the operator, and thus, it is possible to improve the operability.

In the combine 1 according to the present embodiment, the travel unit 2 accepts the turn operation on the steering wheel 29 while the override button 32 is depressed during execution of the automatic travel. When the depressing of the override button 32 is released, if the separation distance from the combine 1 to the travel route is within a predetermined return distance and if the orientation of the main body of the combine 1 relative to the orientation of the travel route is within a predetermined angle, the travel unit 2 is in a state of not accepting the turn operation on the steering wheel 29 and the automatic travel control unit 62 executes the automatic travel based on the travel route. Alternatively, the automatic traveling control unit 62 may execute the automatic travel based on the travel route if the separation distance is within the return distance and the orientation of the main body of the combine 1 relative to the orientation of the travel route is within a predetermined angle. On the other hand, if the separation distance exceeds the return distance, the combine 1 travels, that is, the combine 1 manually travels, while the travel unit 2 is in a state of accepting the turn operation on the steering wheel 29. Alternatively, if the separation distance exceeds the return distance and the orientation of the main body of the combine 1 relative to the orientation of the travel route exceeds a predetermined angle, the combine 1 may perform the manual travel.

As a result, the combine 1 enables the turn operation on the steering wheel 29 only while the override button 32 is depressed during the automatic travel, and thus, it is possible to more reliably suppress the erroneous operation on the steering wheel 29. While the movement when the override button 32 is operated is within a return distance from the travel route or while the orientation of the main body of the combine 1 relative to the orientation of the travel route is within a predetermined angle, the combine 1 is capable of returning to the automatic travel based on the travel route if the override button 32 is released. Therefore, if the turn operation in which the override button 32 is utilized in the automatic travel is used as well, it is possible to easily realize the travel according to the intention of the operator, and thus, it is possible to improve the operability.

It is noted that in the above-described embodiment, the example is described in which the travel unit 2 of the combine 1 accepts the operation on the override button 32 without setting a particular condition during execution of the automatic travel, but the present invention is not limited to such an example.

According to a first modification, the travel unit 2 may not accept the operation on the override button 32 under a predetermined operation unavailable condition. The combine 1 may set an automatic travel zone in which it is not preferable to accept the turn operation on the steering wheel 29 for the operation unavailable condition of the override button 32, and for example, may set an automatic turn travel zone or an automatic backward travel zone.

That is, if the automatic travel control unit 62 executes the automatic forward travel of the combine 1, the travel unit 2 accepts the turn operation on the steering wheel 29 but if the automatic travel control unit 62 executes the automatic turn travel or the automatic backward travel of the combine 1, the travel unit 2 does not accept the turn operation on the steering wheel 29. It is noted that when the travel route creation unit 61 creates the travel route, the combine 1 may previously set an operation unavailable zone of the override button 32 to the travel route, and may make the operation unavailable zone in the created travel route editable.

An example of the travel operation of the combine 1 according to the first modification will be described with reference to a flowchart in FIG. 6. In the first modification, firstly, the combine 1 performs the automatic travel according to operations in steps S21 to S24 of the example of the travel operation illustrated in FIG. 6 in much the same way as the operations in steps S1 to S4 of the example of the travel operation illustrated in FIG. 5.

When the operator operates the override button 32 while the automatic travel is being executed (step S25: Yes), if the automatic travel control unit 62 executes the automatic forward travel of the combine 1 (step S26: Yes), the travel unit 2 is in a state of accepting the turn operation on the steering wheel 29 by the operator (step S27).

On the other hand, if the automatic travel control unit 62 executes the automatic turn travel or the automatic backward travel of the combine 1 (step S26: No), the travel unit 2 maintains the state of not accepting the turn operation on the steering wheel 29 by the operator.

Figure 5:
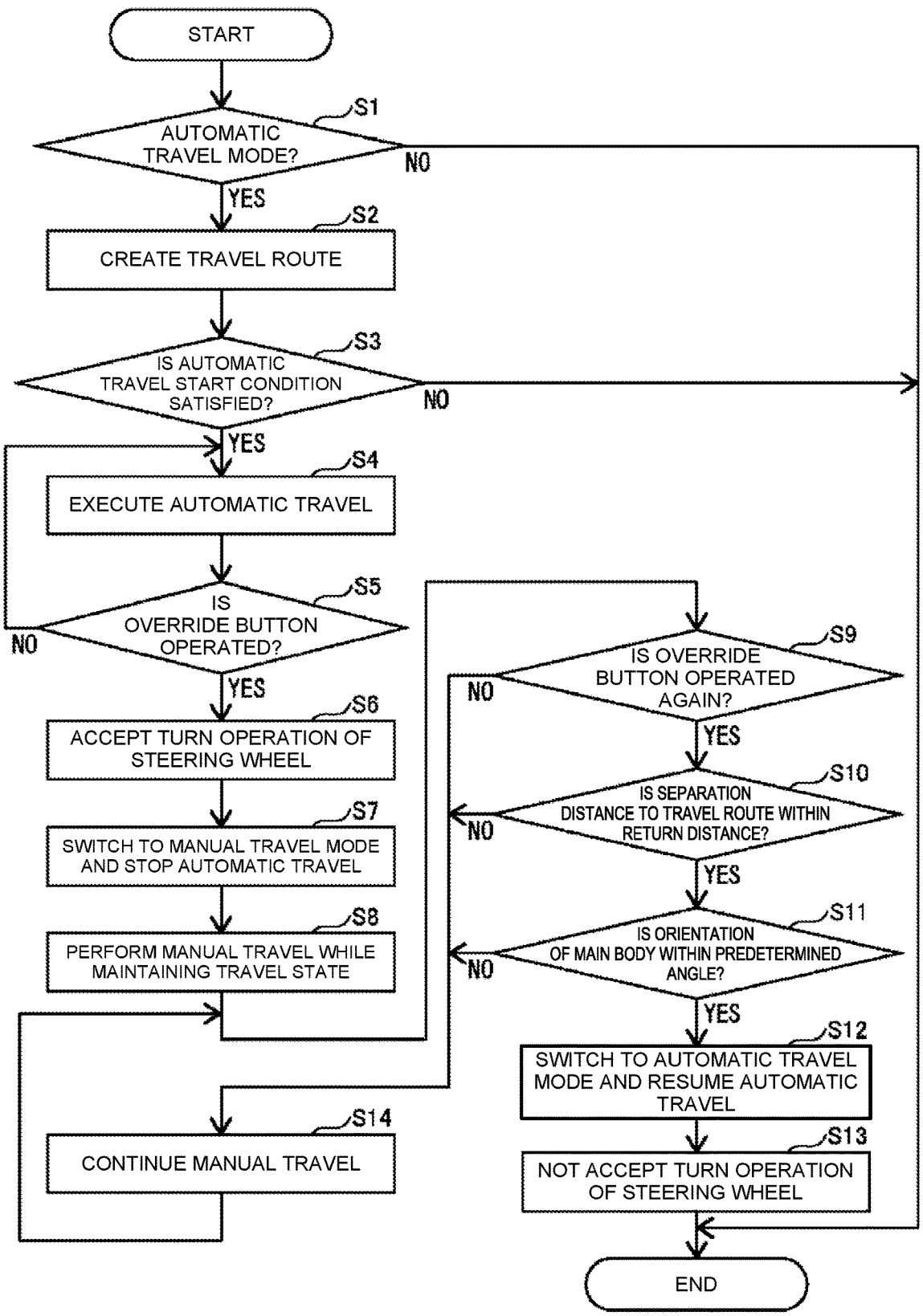
FIG. 5 is a flowchart illustrating an example of a travel operation of a combine according to an embodiment of a work vehicle of the present invention.
Figure 6:
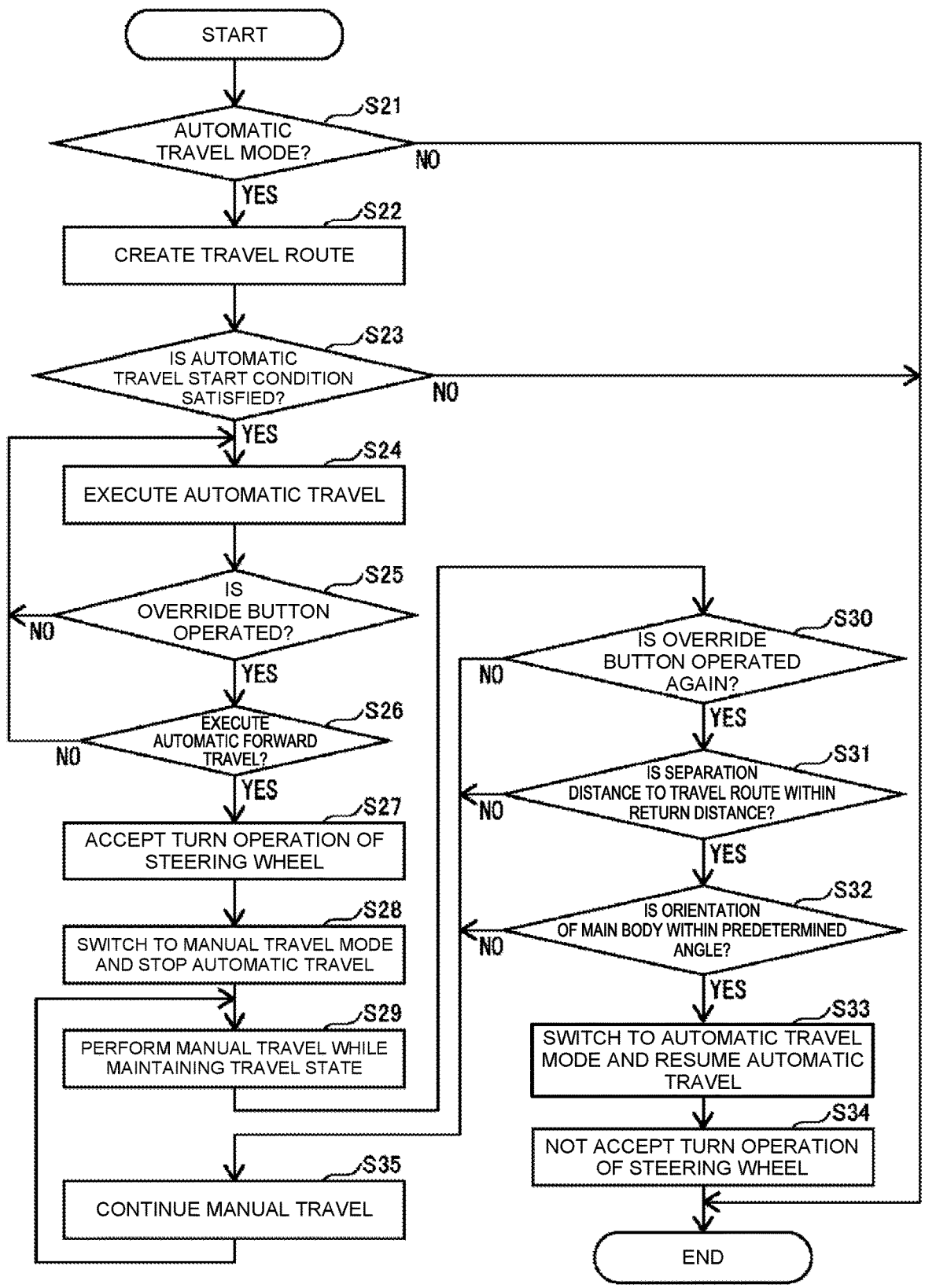
FIG. 6 is a flowchart illustrating an example of a travel operation of a first modification of the combine according to an embodiment of the work vehicle of the present invention.

The operations (steps S28 to S35) after the travel unit 2 accepts the turn operation on the steering wheel 29 during execution of the automatic travel are similar to the operations in steps S7 to S14 of the example of the travel operation illustrated in FIG. 5.

According to the first modification, in a scene where it is not preferable to accept the turn operation on the steering wheel 29 in the automatic travel, the operation on the override button 32 is not accepted, and thus, the turn operation or the erroneous operation on the override button 32 is suppressed, and as a result, it is possible to improve the safety.

In the above-described embodiment, as the operation after the automatic travel is stopped according to the operation on the override button 32, irrespective of the movement direction of the automatic travel being the forward direction or in the backward direction, the example is described in which the combine 1 shifts to the manual travel while the travel unit 2 maintains the travel state to continue traveling when the automatic travel stops, but the present invention is not limited to such an example.

As another example, in the present invention, the automatic travel control unit 62 and the travel unit 2 of the combine 1 may apply a control different depending on the movement direction of the combine 1 when the override button 32 is operated during execution of the automatic travel, to the travel of the combine 1. As a result, if the automatic travel is switched to the manual travel, the combine 1 is capable of traveling based on the control matching the movement direction.

For example, according to the second modification, after the automatic travel control unit 62 stops the automatic forward travel according to the operation on the override button 32, the travel unit 2 continues the travel while maintaining the travel state when the automatic forward travel stops and shifts to the manual forward travel, while, as the control according to the movement direction, after the automatic travel control unit 62 stops the automatic backward travel according to the operation on the override button 32, the automatic travel control unit 62 and the travel unit 2 perform a limited manual travel. In the limited manual travel, the travel unit 2 performs the turn operation of the combine 1 according to the turn operation on the steering wheel 29, and at the same time, the travel unit 2 may perform the speed change operation of the combine 1, the switching operation between the forward-and-backward movements, and the like, according to a previously set control pattern. The limited manual travel being performed may be displayed on the display unit 33 of the steering unit 9 and the display unit 54 of the mobile terminal 53 to notify the operator, or a warning may be output from a speaker or a buzzer provided in the steering unit 9 or the mobile terminal 53.

Incidentally, the automatic backward travel is performed in a state where the main speed change lever 30 is located in the forward speed change region 35, and thus, when the automatic backward travel is stopped and shifted directly to the manual travel, the backward speed when the automatic backward travel is stopped and the forward set speed based on the position of the main speed change lever 30 do not match. At this time, if the forward set speed is set directly to the combine 1 performing the automatic backward travel, the acceleration when immediately switching from the backward speed to the forward set speed is steep and the backward travel is immediately switched to the forward travel, and thus, a sense of discomfort in the operation is applied to the operator and a danger in travel is generated. Also when the forward set speed is directly set to the combine 1 traveling backward in the normal manual travel, the acceleration in immediately switching from the backward speed to the forward set speed is steep.

Therefore, in the limited manual travel, after the automatic travel control unit 62 stops the automatic backward travel according to the operation on the override button 32, the travel unit 2 decelerates from the travel state when the automatic backward travel is stopped, and after that, the travel unit 2 performs a manual forward travel when the backward speed is zero, gradually accelerates until the forward speed reaches forward set speed based on the position of the main speed change lever 30, and when the forward set speed is reached, completely switches to the manual forward travel. As described above, in the limited manual travel, when the acceleration allowing the traveling speed of the combine 1 to gradually switch from the backward speed to the forward set speed is set to be more gradual than the acceleration when the forward set speed is directly set to the combine 1 traveling backward in the normal manual travel in the manual travel mode, the sense of discomfort in the operation applied to the operator is reduced and the danger in travel is also suppressed.

As the travel mode when the limited manual travel is performed, when the override button 32 is operated during execution of the automatic backward travel, the combine 1 switches the travel mode from the automatic travel mode to the limited manual travel mode. When the forward speed reaches the forward set speed by performing the manual forward travel in the limited manual travel, the combine 1 switches the travel mode from the limited manual travel mode to the manual travel mode.

Figure 7:
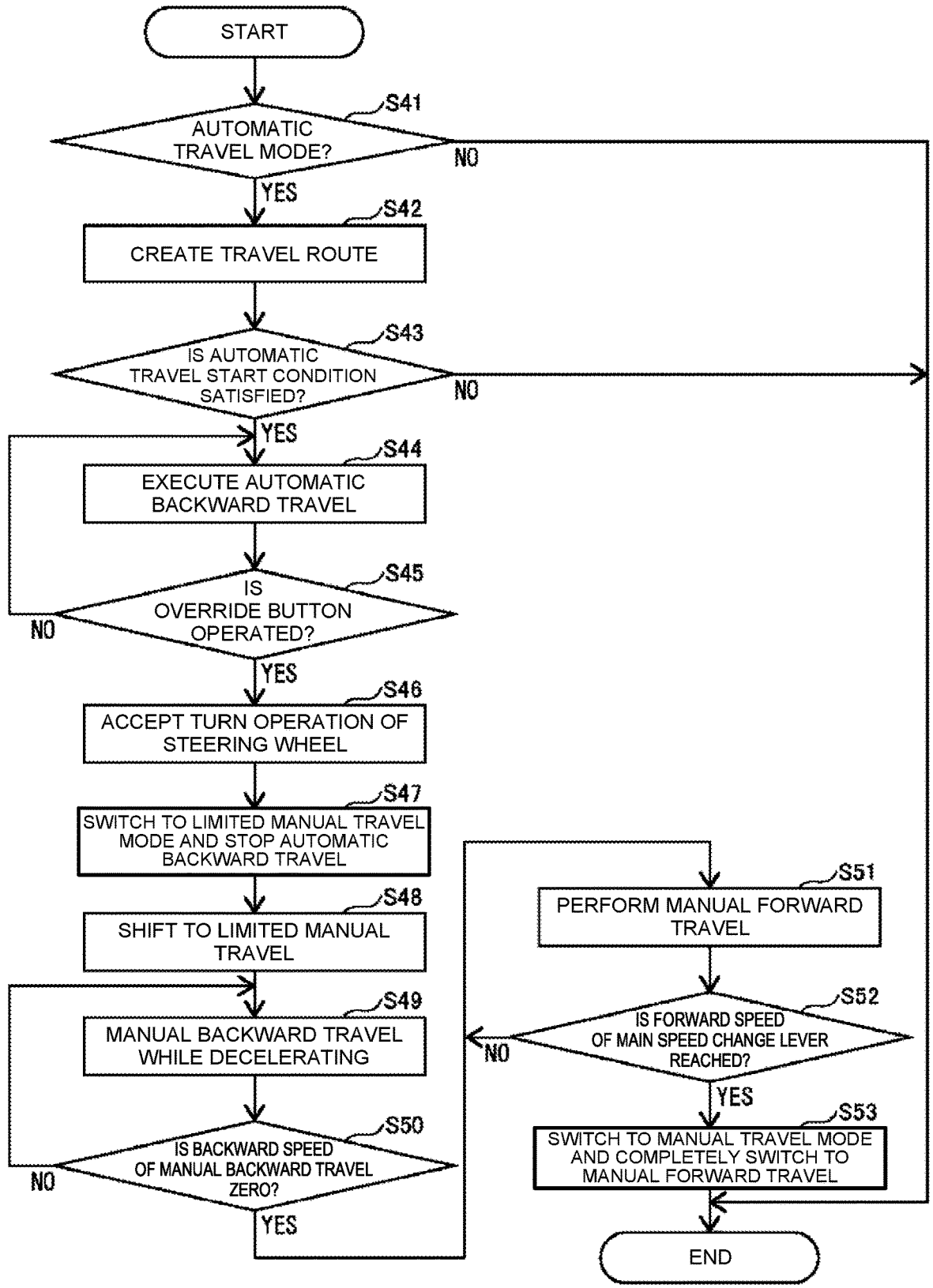
FIG. 7 is a flowchart illustrating an example of a travel operation of a second modification of the combine according to an embodiment of the work vehicle of the present invention.

An example of the travel operation of the combine 1 according to the second modification will be described with reference to a flowchart of FIG. 7. In the second modification, firstly, the combine 1 performs the automatic backward travel according to operations in steps S41 to S47 of the example of the travel operation illustrated in FIG. 7 in much the same way as the operations in steps S1 to S7 of the example of the travel operation illustrated in FIG. 5, the travel unit 2 is in a state of accepting the turn operation on the steering wheel 29 according to the operation on the override button 32, and the automatic travel control unit 62 stops the automatic backward travel based on the travel setting. It is noted that step S47 is different from step S7 in that the combine 1 switches the travel mode from the automatic travel mode to the limited manual travel mode.

The travel unit 2 shifts to the limited manual travel (step S48), and decelerates from the travel state when the automatic backward travel is stopped (step S49). When the backward speed is zero (step S50: Yes), the travel unit 2 performs the manual forward travel (step S51). Further, the travel unit 2 gradually accelerates the forward speed of the manual forward travel, and when the forward speed reaches the forward set speed based on the position of the main speed change lever 30 (step S52: Yes), the combine 1 ends the limited manual travel, switches the travel mode from the limited manual travel mode to the manual travel mode, and completely switches to the manual forward travel (step S53).

As described above, according to the second modification, in the combine 1, the automatic travel control unit 62 executes the automatic travel when the main speed change lever 30 being a speed change operation tool that instructs the combine 1 to change the speed in forward-and-backward movements of is located in the forward speed change region 35. When the override button 32 is operated during execution of the automatic forward travel, in a state where the travel unit 2 accepts the turn operation on the steering wheel 29, based on the position of the main speed change lever 30 in the forward speed change region 35, the travel in the forward direction is maintained, that is, the manual forward travel is performed. On the other hand, as a control according to the movement direction, when the override button 32 is operated during execution of the automatic backward travel, in a state where the travel unit 2 accepts the turn operation on the steering wheel 29, based on the position of the main speed change lever 30 in the forward speed change region 35, the movement direction is changed from the backward direction to the forward direction with an acceleration more gradual than the acceleration when the forward set speed is directly set to the combine 1 performing the backward travel of the normal manual travel, that is, the manual forward travel is performed.

As a result, also when the override button 32 is operated during execution of the automatic backward travel, the combine 1 is capable of gradually switching from the backward movement to the forward movement because the backward speed is gradually switched to the forward set speed by the gradual acceleration, and thus, the sense of discomfort on the operation applied to the operator is reduced and the danger in travel is also suppressed.

According to a third modification, as a control according to the movement direction, after the automatic travel control unit 62 stops the automatic backward travel according to the operation on the override button 32, without switching to the manual forward travel, irrespective of the position of the main speed change lever 30 in the forward speed change region 35, the travel unit 2 may shift to the manual backward travel while maintaining the travel state to continue the travel when the automatic backward travel is stopped. In this case, if the main speed change lever 30 is operated to the neutral position 34, the travel unit 2 releases the travel state when the automatic backward travel is stopped and shifts to the normal manual travel, and after that, performs the manual travel at the forward set speed or the backward set speed according to the position of the main speed change lever 30.

It is noted that as the travel mode in this case, when the override button 32 is operated during execution of the automatic forward travel, the combine 1 may switch the travel mode from the automatic travel mode to the manual travel mode.

Figure 8:
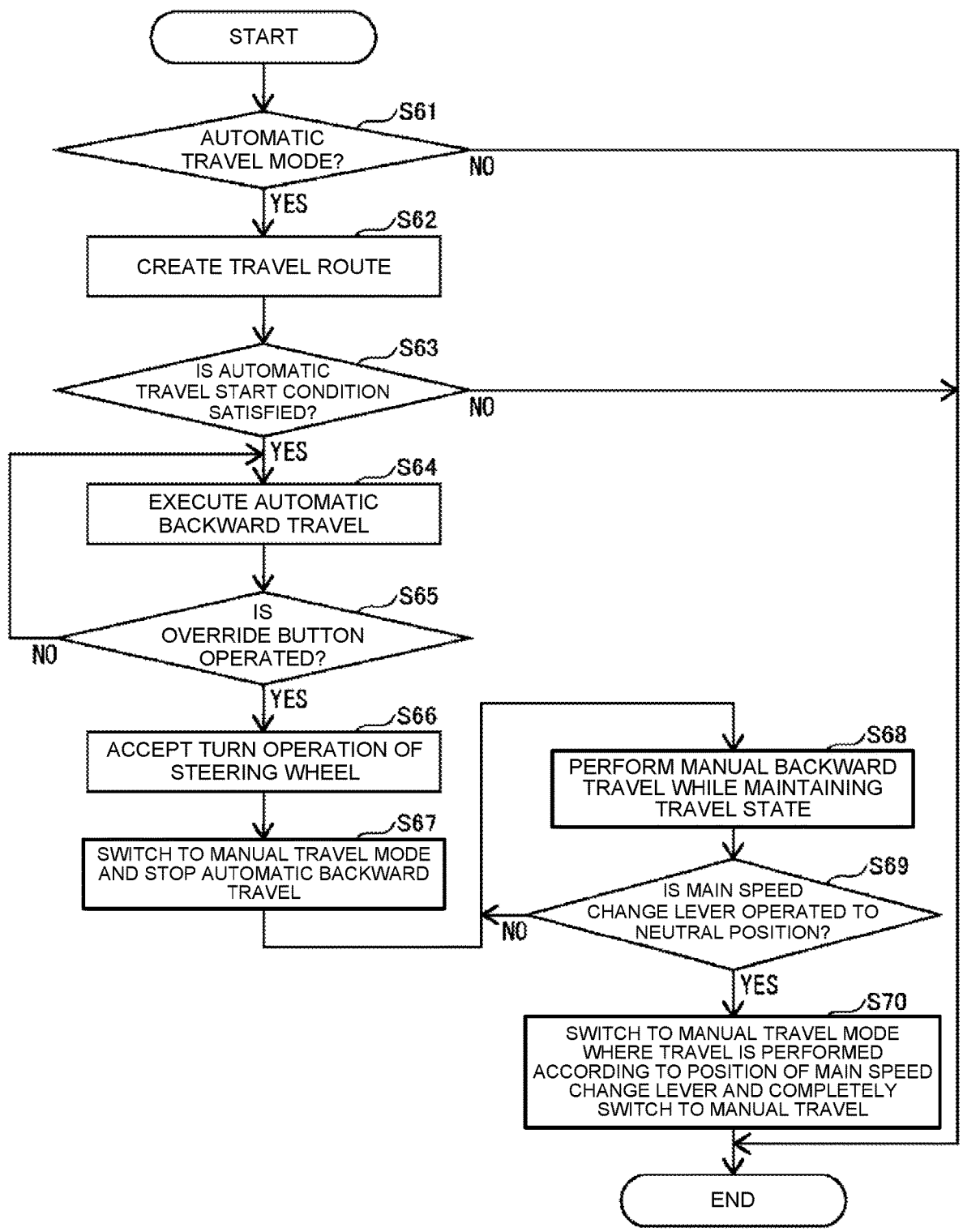
FIG. 8 is a flowchart illustrating an example of a travel operation of a third modification of the combine according to an embodiment of the work vehicle of the present invention.

An example of the travel operation of the combine 1 according to the third modification will be described with reference to a flowchart of FIG. 8. In the third modification, firstly, the combine 1 performs the automatic backward travel according to operations in steps S61 to S67 of the example of the travel operation illustrated in FIG. 8 in much the same way as the operations in steps S1 to S7 of the example of the travel operation illustrated in FIG. 5, the travel unit 2 is in a state of accepting the turn operation on the steering wheel 29 according to the operation on the override button 32, and the automatic travel control unit 62 stops the automatic backward travel based on the travel setting.

The combine 1 switches the travel mode from the automatic travel mode to the manual travel mode, and irrespective of the position of the main speed change lever 30 in the forward speed change region 35, the travel unit 2 shifts to the manual backward travel while maintaining the travel state when the automatic backward travel is stopped (step S68). When the main speed change lever 30 is operated to the neutral position 34 (step S69: Yes), the combine 1 ends the manual backward travel and switches to the manual travel mode where the combine 1 travels according to the position of the main speed change lever 30, and the travel unit 2 releases the travel state when the automatic backward travel is stopped, and completely switches to the manual travel (step S70).

As described above, according to the third modification, in the combine 1, the automatic travel control unit 62 executes the automatic travel when the main speed change lever 30 that instructs the combine 1 to change the speed in forward-and-backward movements is located in the forward speed change region 35. When the override button 32 is operated during execution of the automatic forward travel, in a state where the travel unit 2 accepts the turn operation on the steering wheel 29, the travel in the forward direction is maintained based on the position of the main speed change lever 30 in the forward speed change region 35, that is, the manual forward travel is performed. On the other hand, as a control according to the movement direction, when the override button 32 is operated during execution of the automatic backward travel, in a state where the travel unit 2 accepts the turn operation on the steering wheel 29, irrespective of the position of the main speed change lever 30 in the forward speed change region 35, the travel in the backward direction is maintained, that is, the manual backward travel is performed.

As a result, even when the override button 32 is operated during execution of the automatic backward travel, the combine 1 maintains the travel in the backward direction irrespective of the position of the main speed change lever 30, it is possible to improve the operability, and the backward movement is not immediately switched to the forward movement, and thus, the sense of discomfort on the operation applied to the operator is reduced and the danger in travel is also suppressed.

According to a fourth modification, as the control according to the movement direction, when the automatic travel control unit 62 stops the automatic backward travel according to the operation on the override button 32, the travel unit 2 may stop the travel of the combine 1 to stop the combine 1, irrespective of the position of the main speed change lever 30 in the forward speed change region 35. In this case, the travel unit 2 gradually decelerates until the backward speed is zero since the automatic backward travel stops.

When the override button 32 is operated again after the travel of the combine 1 is stopped, the travel unit 2 switches to the manual travel and gradually increases the speed until the travel speed of the combine 1 reaches the forward set speed or the backward set speed according to the position of the main speed change lever 30. Alternatively, when the main speed change lever 30 is operated to the neutral position 34 after the travel of the combine 1 is stopped, the travel unit 2 switches to the manual travel, and after that, the combine 1 travels at the forward set speed or the backward set speed according to the position of the main speed change lever 30.

It is noted that as the travel mode in this case, when the override button 32 is operated during execution of the automatic forward travel, the combine 1 switches the travel mode from the automatic travel mode to the manual travel mode.

Figure 9:
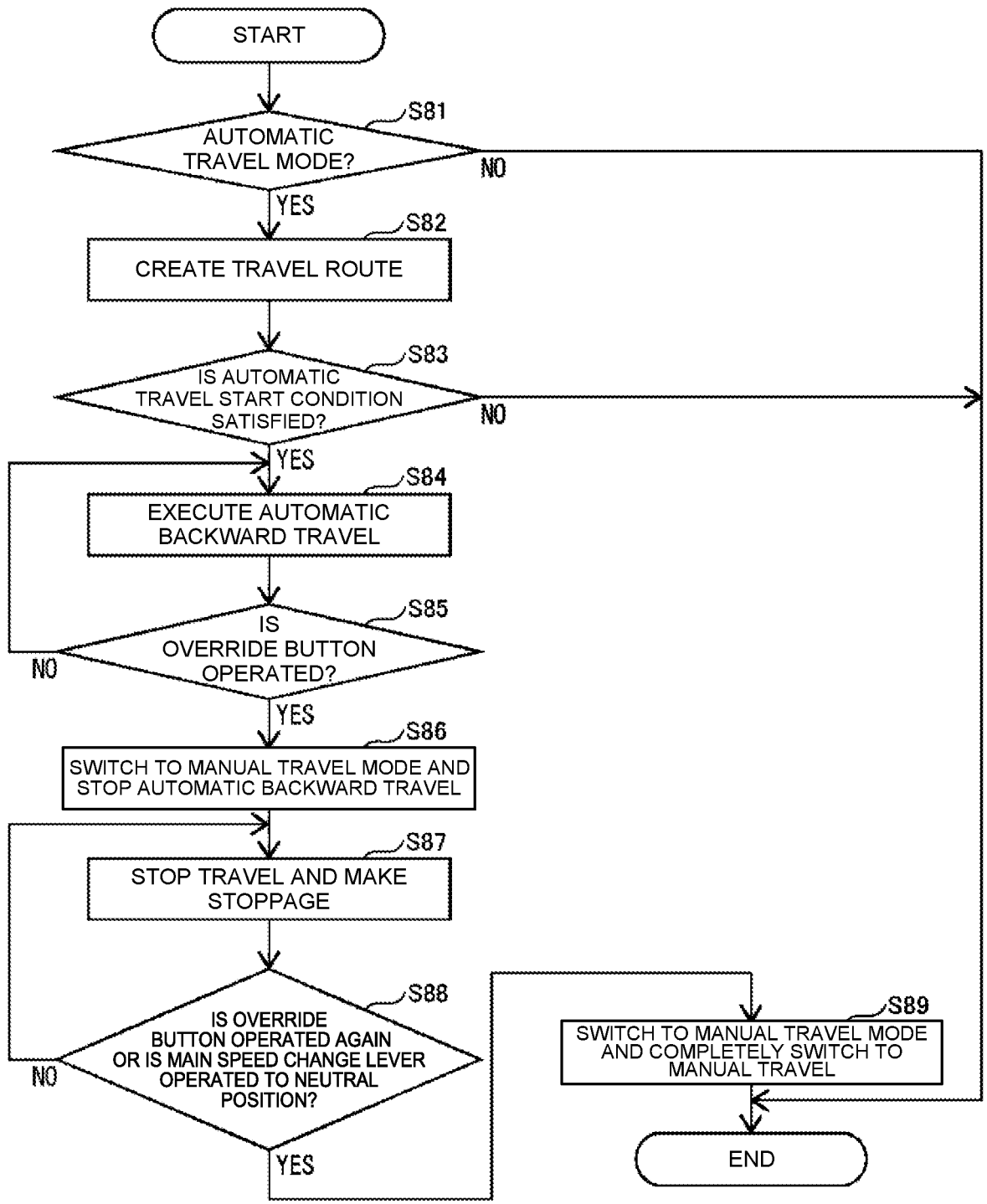
FIG. 9 is a flowchart illustrating an example of a travel operation of a fourth modification of the combine according to an embodiment of the work vehicle of the present invention.

An example of the travel operation of the combine 1 according to the fourth modification will be described with reference to a flowchart of FIG. 9. In the fourth modification, firstly, the combine 1 performs the automatic backward travel according to operations in steps S81 to S86 of the example of the travel operation illustrated in FIG. 9 in much the same way as the operations in steps S41 to S45, and S47 of the example of the travel operation illustrated in FIG. 7, and according to the operation on the override button 32, the automatic travel control unit 62 stops the automatic backward travel based on the travel setting. In the fourth modification, when the override button 32 is operated, the travel unit 2 may maintain a state of not accepting the turn operation on the steering wheel 29, and alternatively, the travel unit 2 may be in a state of accepting the turn operation on the steering wheel 29.

At this time, the travel unit 2 stops the travel of the combine 1 to stop the combine 1 irrespective of the position of the main speed change lever 30 in the forward speed change region 35 (step S87). After that, when the override button 32 is operated again or when the main speed change lever 30 is operated to the neutral position 34 (step S88: Yes), the combine 1 switches the travel mode to the manual travel mode in which the combine 1 travels according to the position of the main speed change lever 30 to realize a state of accepting the turn operation on the steering wheel 29, and the travel unit 2 completely switches to the manual travel (step S89).

As described above, according to the fourth modification, in the combine 1, when the override button 32 is operated during execution of the forward automatic travel, the travel unit 2 maintains the travel in the forward direction in a state of accepting the turn operation on the steering wheel 29, that is, performs the manual forward travel. On the other hand, as the control according to the movement direction, when the override button 32 is operated during execution of the automatic backward travel, the automatic travel control unit 62 stops the travel of the combine 1 to stop the combine 1.

As a result, when the override button 32 is operated during execution of the automatic backward travel, the combine 1 is stopped, and thus, the combine 1 is not immediately switched from the backward movement to the forward movement, and it is possible to suppress the danger in travel, and possible to secure the safety.

Alternatively, according to the fourth modification, in the combine 1, the automatic travel control unit 62 executes the automatic travel when the main speed change lever 30 that instructs the combine 1 to change the speed in forward-and-backward movements is located in the forward speed change region 35. Further, as a control according to movement direction, when the override button 32 is operated during execution of the automatic backward travel, the automatic travel control unit 62 stops the travel of the combine 1, and when the main speed change lever 30 is operated to the neutral position 34 to change the speed, the travel unit 2 accepts the turn operation on the steering wheel 29, that is, performs the manual travel.

As a result, when the override button 32 is operated during execution of the automatic backward travel, the combine 1 is stopped, and thus, it is possible to secure the safety. Further, the manual travel is performed according to the operation on the main speed change lever 30 to the neutral position 34, and thus, it is possible to perform the manual travel according to the intention of the operator and possible to improve the operability.

Further, in the above-described embodiment, the example is described in which in the combine 1, during execution of the automatic travel, when the override button 32 is operated, the travel unit 2 accepts the turn operation on the steering wheel 29, but the present invention is not limited to such an example. In another example, it is possible to adopt an example where when the main speed change lever 30 is operated within the forward speed change region 35 during execution of the automatic backward travel, the automatic travel control unit 62 stops the automatic backward travel, and the travel unit 2 is in a state of accepting the turn operation on the steering wheel 29. Thus, after the automatic backward travel is stopped according to the operation on the main speed change lever 30, the automatic travel control unit 62 and the travel unit 2 may perform the limited manual travel.

In the limited manual travel in this case, similarly to the above, after the automatic travel control unit 62 stops the automatic backward travel according to the speed change operation on the main speed change lever 30, the travel unit 2 continues the manual backward travel while maintaining the travel state when the automatic backward travel is stopped, and gradually decelerates until the backward speed is zero. After that, the travel unit 2 switches to manual forward travel and gradually accelerates until the forward speed reaches the forward set speed based on the position of the main speed change lever 30.

Alternatively, after the automatic backward travel is stopped according to the operation on the main speed change lever 30, the travel unit 2 may continue the travel while maintaining the travel state when the automatic travel is stopped and shift to the manual backward travel, irrespective of the position of the main speed change lever 30. In this case, if the main speed change lever 30 is operated to the neutral position 34, the travel unit 2 releases the travel state when the automatic backward travel is stopped and shifts to the normal manual travel, and after that, performs the manual travel at the forward set speed or the backward set speed according to the position of the main speed change lever 30.

Alternatively, after the automatic backward travel is stopped according to the operation on the main speed change lever 30, the travel unit 2 may stop the travel of the combine 1 to stop the combine 1, irrespective of the position of the main speed change lever 30. In this case, the travel unit 2 gradually decelerates until the backward speed is zero since the automatic backward travel stops. Further, when the main speed change lever 30 is operated to the neutral position 34 after the travel of the combine 1 is stopped, the travel unit 2 switches to the manual travel, and after that, the combine 1 travels at the forward set speed or at the backward set speed according to the position of the main speed change lever 30.

In the above-described embodiment, the example where the combine 1 sets an operation unavailable condition in which the operation on the override button 32 is not accepted, is described, but in another example, an operation available condition in which the operation on the override button 32 is accepted may be set. For example, as the operation available condition of the override button 32, a condition in which the combine 1 is temporarily suspended during the automatic travel may be used. In this case, the combine 1 includes the steering unit 9 and the mobile terminal 53 with a stop button 56, and the automatic travel control unit 62 temporarily suspends the automatic travel of the combine 1 according to the operation on the stop button 56. While the automatic travel of the combine 1 is temporarily suspended, the travel unit 2 accepts the operation on the override button 32.

In the above-described embodiment, the example is described where if the combine 1 shifts from the automatic travel to the manual travel according to the operation on the override button 32 and the override button 32 is operated again, when the separation distance from the combine 1 to the travel route exceeds the return distance or when the orientation of the main body of the combine 1 relative to the orientation of the travel route exceeds a predetermined angle, the automatic travel control unit 62 does not resume the automatic travel based on the travel route and the travel unit 2 continues the manual travel of the combine 1, but the present invention is not limited to such an example. For example, also when the separation distance from the combine 1 to the travel route exceeds the return distance or when the orientation of the main body of the combine 1 relative to the orientation of the travel route exceeds a predetermined angle, according to a re-operation on the override button 32 or an operation on a return button (not illustrated) provided in the steering unit 9 and the mobile terminal 53, the combine 1 may create an automatic return route from the combine 1 to the travel route, and the automatic travel control unit 62 may execute an automatic return travel in which the combine 1 is returned to the travel route according to the automatic return route.

In the above-described embodiment, the example is described where if the combine 1 performs the automatic travel according to the travel route, it is a precondition that the main speed change lever 30 is positioned in the forward speed change region 35, and in the automatic backward travel, irrespective of the position in the front-rear direction of the main speed change lever 30, the backward set speed being a constant speed is set to the travel unit 2, but the present invention is not limited to such an example. For example, if the automatic travel control unit 62 executes the automatic forward travel of the combine 1 according to the travel route, when the main speed change lever 30 is operated from the forward speed change region 35 to the backward speed change region 36, the automatic travel control unit 62 may execute the automatic backward travel of the combine 1 according to the travel route at the backward set speed according to the position of the main speed change lever 30 in the backward speed change region 36. In this case, the automatic travel control unit 62 sets the backward set speed, which is accelerated and decelerated, according to the position of the main speed change lever 30 in the backward speed change region 36, to the travel unit 2.

In the above-described embodiment, the example is described where the override button 32 is configured by a push button, the override button 32 serving as the turn operation permission unit that permits the turn operation on the steering wheel 29 being the turn operation tool during execution of the automatic travel of the combine 1, but the present invention is not limited to such an example. For example, the turn operation permission unit may be configured by a lever provided integrally with the steering wheel 29 and when the operator holds the lever together with the steering wheel 29, the turn operation permission unit may be in a state of being depressed.

In the above-described embodiment, the example is described where the control device 50 of the combine 1 functions as the farm field information setting unit 60, the travel route creation unit 61, the automatic travel control unit 62, and the automatic reaping control unit 63, but the present invention is not limited to such an example. For example, in another embodiment, it may be configured such that the mobile terminal 53 functions as the farm field information setting unit 60, the travel route creation unit 61, the automatic travel control unit 62, and the automatic reaping control unit 63. In other words, the automatic driving system according to the present invention may apply at least one of the control device 50 of the combine 1 and the mobile terminal 53 to function as the farm field information setting unit 60, the travel route creation unit 61, the automatic travel control unit 62, and the automatic reaping control unit 63, and the travel unit 2 may not accept the turn operation under a normal circumstance during execution of the automatic travel but once the override button 32 is operated, may accept the turn operation.

In the above-described embodiment, the example is described where the work vehicle according to the present invention is configured by the head-feeding type combine 1, but the present invention is not limited to such an example, and the work vehicle according to the present invention may be configured as a passenger work vehicle such as an ordinary combine, a tractor, a passenger mower, a passenger rice transplanter, a transport vehicle, a snowplow, and a wheel loader, and an unmanned work vehicle such as an unmanned mower.

It is noted that the present invention may be appropriately modified within the range not contrary to the gist or idea of the present invention understandable from the claims and the entire specification, and an automatic driving method, a work vehicle, and an automatic driving system with such a modification are also included in the technological idea of the present invention.

REFERENCE SIGNS LIST

1 . . . Combine (work vehicle)
2 . . . Travel unit
9 . . . Steering unit
12 . . . Power transmission mechanism
29 . . . Steering wheel (turn operation tool)
30 . . . Main speed change lever (speed change operation tool)
32 . . . Override button (turn operation permission unit)
50 . . . Control device
51 . . . Storage unit
53 . . . Mobile terminal
60 . . . Farm field information setting unit
61 . . . Travel route creation unit
62 . . . Automatic travel control unit
63 . . . Automatic reaping control unit

The invention claimed is:

1. An automatic driving method for a work vehicle executing an automatic travel, based on a preset travel route, comprising:
a turn instruction step of instructing the work vehicle to turn according to a turn operation on a turn operation tool provided in the work vehicle;
an automatic travel control step of controlling the automatic travel of the work vehicle, based on the travel route; and
a permission operation step of permitting the turn operation on the turn operation tool during execution of the automatic travel according to an operation on a turn operation permission unit provided in the work vehicle, wherein
in the turn instruction step, during execution of the automatic travel, the turn operation on the turn operation tool is accepted in response to operation of the turn operation permission unit.

2. The automatic driving method according to claim 1, further comprising: in response to a subsequent operation of the turn operation permission unit after acceptance of the turn operation in the turn instruction step, and a determination that a separation distance from the work vehicle to the travel route is within a predetermined distance, executing the automatic travel based on the travel route.

3. The automatic driving method according to claim 1, further comprising: in response to a subsequent operation of the turn operation permission unit after acceptance of the turn operation in the turn instruction step, and a determination that an orientation of the work vehicle relative to an orientation of the travel route is within a predetermined angle, executing the automatic travel based on the travel route.

4. The automatic driving method according to claim 1, wherein in the turn instruction step, during execution of the automatic travel, while the turn operation permission unit is being depressed, the turn operation on the turn operation tool is accepted,
when the depressing of the turn operation permission unit is released, in response to a determination that a separation distance from the work vehicle to the travel route is within a predetermined distance, the turn operation on the turn operation tool is not accepted in the turn instruction step, and in the automatic travel control step, executing the automatic travel based on the travel route.

5. The automatic driving method according to claim 4, wherein in the turn instruction step, during execution of the automatic travel, while the turn operation permission unit is being depressed, the turn operation on the turn operation tool is accepted,
when the depressing of the turn operation permission unit is released, in response to a determination that an orientation of the work vehicle relative to an orientation of the travel route is within a predetermined angle, the turn operation on the turn operation tool is not accepted in the turn instruction step, and in the automatic travel control step, executing the automatic travel based on the travel route.

6. The automatic driving method according to claim 1, wherein in the turn instruction step, in response to a predetermined operation unavailable condition setting, the operation on the turn operation permission unit is not accepted.

7. The automatic driving method according to claim 1, wherein the automatic travel control step further comprises, during execution of the automatic travel, applying a control based on a movement direction of the work vehicle when the turn operation permission unit is operated.

8. The automatic driving method according to claim 7, further comprising, in the automatic travel control step, when a speed change operation tool that instructs the work vehicle to change a speed in forward-and-backward movements of the work vehicle is located in a forward speed change region, executing the automatic travel, wherein
when the turn operation permission unit is operated during execution of the automatic travel in a forward direction, in a state where the turn operation on the turn operation tool is accepted in the turn instruction step, the travel in the forward direction is maintained based on the position of the speed change operation tool in the forward speed change region, and
when the turn operation permission unit is operated during execution of the automatic travel in a backward direction, in a state where the turn operation on the turn operation tool is accepted in the turn instruction step, a travel direction is switched to the forward direction based on the position of the speed change operation tool in the forward speed change region, with wherein the travel direction is switched with first acceleration that is lower than a second acceleration when the work vehicle is switched from performing a backward manual travel.

9. The automatic driving method according to claim 7, further comprising, in the automatic travel control step, when a speed change operation tool that instructs the work vehicle to change a speed in forward-and-backward movements of the work vehicle is located in a forward speed change region, executing the automatic travel, wherein
when the turn operation permission unit is operated during execution of the automatic travel in a forward direction, in a state where the turn operation on the turn operation tool is accepted in the turn instruction step, the travel in the forward direction is maintained based on the position of the speed change operation tool in the forward speed change region, and
when the turn operation permission unit is operated during execution of the automatic travel in a backward direction, in a state where the turn operation on the turn operation tool is accepted in the turn instruction step, the travel in the backward direction is maintained without regard to the position of the speed change operation tool.

10. The automatic driving method according to claim 7, wherein when the turn operation permission unit is operated during execution of the automatic travel in a forward direction, in a state where the turn operation on the turn operation tool is accepted in the turn instruction step, the travel in the forward direction is maintained, and
when the turn operation permission unit is operated during execution of the automatic travel in a backward direction, the travel of the work vehicle is stopped in the automatic travel control step.

11. The automatic driving method according to claim 10, wherein in the automatic travel control step, when a speed change operation tool that instructs the work vehicle to change a speed in forward-and-backward movements of the work vehicle is located in a forward speed change region, the automatic travel is executed, and
when the turn operation permission unit is operated during execution of the automatic travel in a backward direction, the travel of the work vehicle is stopped in the automatic travel control step, and when the speed change operation tool is operated to a neutral position to change the speed, the turn operation on the turn operation tool is accepted in the turn instruction step.

12. A work vehicle performing an automatic travel, based on a preset travel route, comprising:
a turn operation tool that accepts a turn operation to instruct turning;
an automatic travel control unit that controls the automatic travel based on the travel route; and
a turn operation permission unit that permits a turn operation on the turn operation tool during execution of the automatic travel, wherein
the turn operation tool accepts the turn operation during automatic travel in response to operation of the turn operation permission unit.

13. An automatic driving system provided with a work vehicle performing an automatic travel, based on a preset travel route, comprising:
a turn operation tool that accepts a turn operation to instruct turning of the work vehicle;
an automatic travel control unit that controls the automatic travel of the work vehicle, based on the travel route; and
a turn operation permission unit that permits a turn operation on the turn operation tool during execution of the automatic travel, wherein
the turn operation tool accepts the turn operation during automatic travel in response to operation of the turn operation permission unit.

* * * * *